(12) United States Patent  
Schumann et al.

(10) Patent No.: US 8,187,352 B2
(45) Date of Patent: May 29, 2012

(54) FILTER

(76) Inventors: Klaus Schumann, Weil am Rhein (DE); Gebhard Schumann, Sevzach (CH)

(*) Notice: Subject to any disclaimer, the term of this patent is extended or adjusted under 35 U.S.C. 154(b) by 149 days.

(21) Appl. No.: 12/563,381

(22) Filed: Sep. 21, 2009

(65) Prior Publication Data

US 2011/0067370 A1 Mar. 24, 2011

(51) Int. Cl.
*B01D 46/02* (2006.01)
(52) U.S. Cl. ............... 55/378; 55/379; 55/492
(58) Field of Classification Search ............ 55/341, 55/302, 378, 379, 341.1, 490, 492, 498, 529, 55/361, 380
See application file for complete search history.

(56) References Cited

U.S. PATENT DOCUMENTS

| | | | | |
|---|---|---|---|---|
| 2,774,443 A * | 12/1956 | Slayter | ............................ | 55/379 |
| 2,814,357 A * | 11/1957 | Bowman | ......................... | 55/334 |
| 3,853,509 A * | 12/1974 | Leliaert | ......................... | 55/341.1 |
| 4,084,948 A * | 4/1978 | MacFarland | ..................... | 55/366 |
| 4,259,095 A | 3/1981 | Johnson, Jr. | | |
| 4,291,904 A * | 9/1981 | Iversen et al. | ............. | 285/140.1 |
| 4,336,035 A * | 6/1982 | Evenstad et al. | ................ | 95/286 |
| 4,749,485 A * | 6/1988 | DeGraffenreid | ........... | 210/323.1 |
| 5,066,315 A * | 11/1991 | Haberl et al. | ................... | 95/271 |
| 5,118,421 A * | 6/1992 | Scarano | ......................... | 210/485 |
| 5,230,726 A * | 7/1993 | Smith et al. | ..................... | 55/487 |
| 5,858,039 A * | 1/1999 | Schumann et al. | ............. | 55/378 |
| 5,902,365 A * | 5/1999 | Haggard | ......................... | 55/498 |
| 5,916,435 A | 6/1999 | Spearman | | |
| 6,547,856 B2 * | 4/2003 | Cartellone | ..................... | 95/268 |
| 6,833,023 B1 * | 12/2004 | Vandenberghe et al. | ........ | 95/268 |
| 7,320,717 B2 * | 1/2008 | Koeberle | ......................... | 55/302 |
| 7,404,838 B1 * | 7/2008 | Pathak | ............................ | 55/490 |
| 7,481,862 B2 * | 1/2009 | Attassery | ......................... | 55/502 |
| 7,485,592 B2 * | 2/2009 | Kohli et al. | ..................... | 442/415 |
| 7,597,773 B2 * | 10/2009 | Kume et al. | ..................... | 156/205 |
| 2002/0040569 A1 * | 4/2002 | Reinhold | ......................... | 55/498 |
| 2002/0129706 A1 * | 9/2002 | Cartellone | ..................... | 95/268 |
| 2002/0174770 A1 | 11/2002 | Badeau et al. | | |
| 2003/0177744 A1 * | 9/2003 | Gerakios et al. | ................ | 55/378 |
| 2005/0138903 A1 * | 6/2005 | Jensen et al. | ..................... | 55/361 |

FOREIGN PATENT DOCUMENTS

JP 09108519 A 4/1997
KR 10-2006-0133937 A 12/2006

OTHER PUBLICATIONS

Citing the definition of "propeller" as found in Merriam-Webster Dictionary online. www.merriam-webster.com/dictionary/propeller (May 10, 2011).*

* cited by examiner

*Primary Examiner* — Duane Smith
*Assistant Examiner* — Pankti Patel
(74) *Attorney, Agent, or Firm* — B. Craig Killough (57) ABSTRACT

A filter bag is longitudinally formed in a frusto-conical shape The filter bag has a plurality of radially extending members that form a propeller shaped cross-section, and a propeller-shaped molded bottom that enhances dust fall from the exterior. A frusto-conically-shaped inner cage facilitates the shape of the filter bag of the filter element.

15 Claims, 7 Drawing Sheets

FILTER

FIELD OF THE INVENTION

The present invention relates to filters used in air filtration generally and is more specifically related to pulse-jet filter elements and filter-cage assemblies, and to cartridge filters, of the type typically used in industrial applications.

BACKGROUND OF THE INVENTION

Filter elements in use have cylindrical filter bags, mounted onto cylindrical wire cages, which are installed by means of snap-ring fittings in the housing. Air is drawn through the filter bags during the filtration process. In pulse-jet filter applications, the air flow direction is reversed during the cleaning cycle.

The filter bags are closed on the bottom and open on the top. The dust laden air is drawn through the filter bag from an exterior of the filter bag, and the dust particles are retained on the surface of the filter bag. The air-to-cloth ratio, dust particle size, electrostatic properties of dust and filter cloth, can velocity, dust retention and cake-release of a given filter material and the filtration surface texture determine the efficiency of a filter. Pulse-jet filter bags are limited by the length and circumference of the filter bags and the can velocity due to the small open space between the circular filter bags and bag housing. Improving efficiency by increasing the size of the filter housing, or increasing the number of filter bags, is expensive and is often impractical. The circular, sewed-on bottoms often protrude beyond the sides of the bags of the filter elements and become obstacles that catch and collect dust, which later impedes dust release in the cleaning cycle, and creates a negative impact on the can velocity at the bottom of the filter elements.

Similarly, cartridge filters have the disadvantage of being limited in temperature resistance and in length, which typically may not exceed two meters. High differential pressure causes the pleats to concave at the tips of the pleats, thereby reducing the effective filter area at this point. In addition, dust and other undesirable particles build up on the outside between the pleats and, in some cases, completely clog the cartridge filter. The extruding rim of the bottom plate of the cartridge filter is frequently an obstacle that catches and retains dust, preventing the collected dust from falling down into the hopper.

SUMMARY OF THE INVENTION

The filter has radially extending fingers or rays that yield a filter bag having a propeller-shaped cross section. The present invention significantly increases the filtration surface while using the same number of filter elements at the same gas volume, and also using the same bag diameter and bag length of conventional pulse-jet filter bags. Additionally, the structure of the invention reduces the air to cloth ratio, can velocity and differential pressures, which leads to significant efficiency gains with respect to emission values and energy consumption.

Radially extending portions of the filter elements lend a propeller shape to the device of the invention. The sides of the bag are formed to allow an easy collection of dust and the propeller-shaped bottom of the bag has no obstacles that accumulate falling dust, thus enhancing dust-cake release during the cleaning cycle. By substituting normal pulse-jet filter element bags with frusto-conical, propeller-shaped moulded bottom filter element bags in a jet-filter bag-housing, this invention substantially increases the filter capacity of the bag housing, while simultaneously significantly reducing energy consumption and operating costs. The number of filter elements, as well as space needed for the new filter housing, is substantially reduced.

DETAILED DESCRIPTION OF THE PREFERRED EMBODIMENTS

Figure 1:
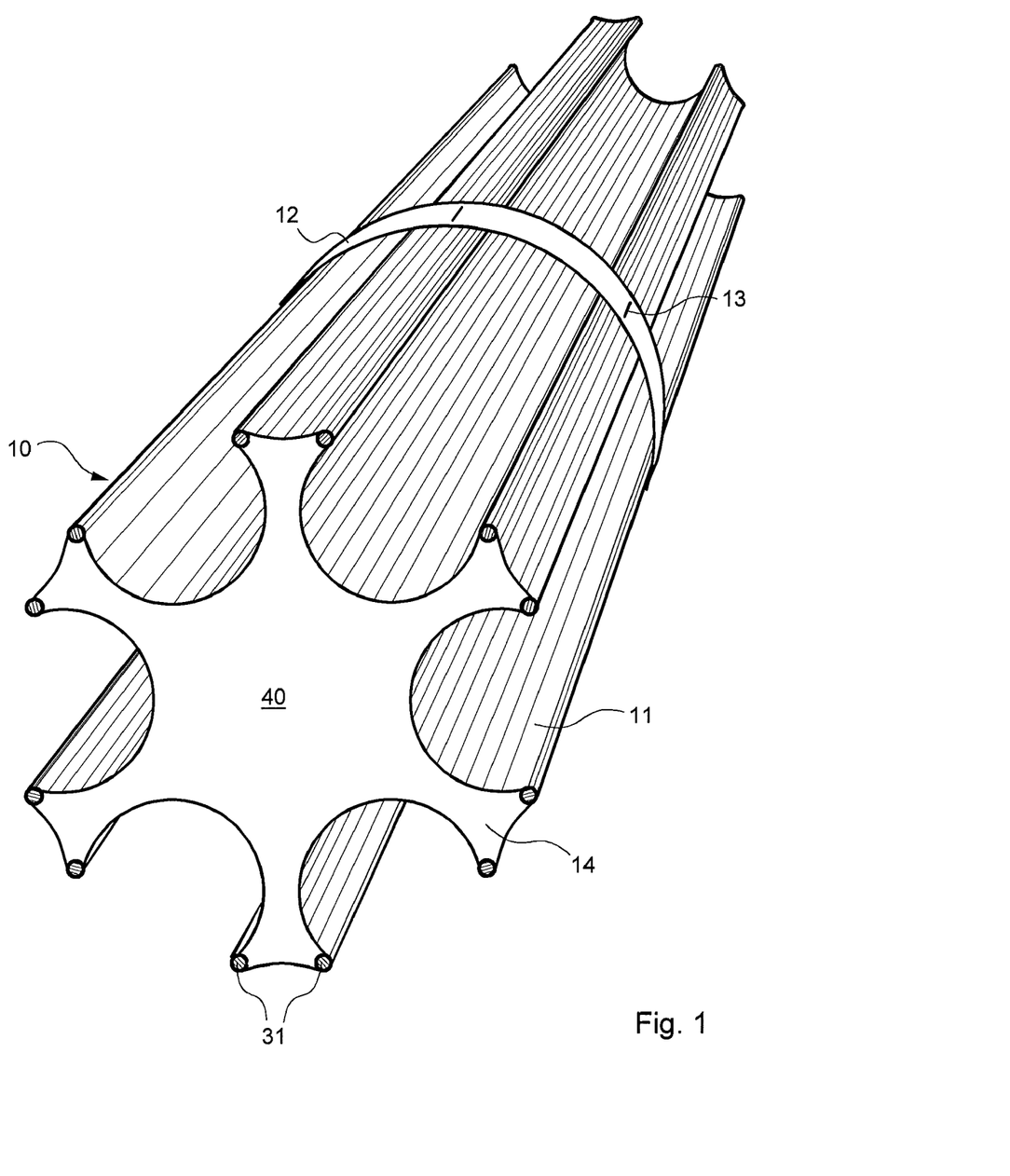
FIG. 1 is a perspective view of a 6-ray frusto-conical propeller-shaped embodiment of the fabric filter used in a filtration process.

FIG. 1 is a perspective view of a 6-ray frusto-conical propeller-shaped embodiment of filter bag 10. The filter bag is shown as used during a filtration process under negative differential pressure. A horizontal, circular band 12 may surround the filter bag. The filter bag 10 is comprised of filter cloth 11 which has a circumference that is materially larger than the circumference of the circular band 12. The circular band is preferred to be circumferentially attached in regular intervals by fasteners such as staples 13 or seams, or other techniques to the filter fabric 11, thereby holding the filter bag 10 permanently in a propeller shape 40. This design allows the filter cloth 11 known in the art, such as needled felt, non-woven material, woven material, warp-knitted, circular knitted, micro-filament or micro-fiber fabric, fiberglass and/ or woven metal or monofilament filter material to form over the longitudinal wire pairs 31 of the inner cage 30 into a propeller shape during filtration, and hold this position during the reversal of air or gas flow during the cleaning cycle.

Figure 6:
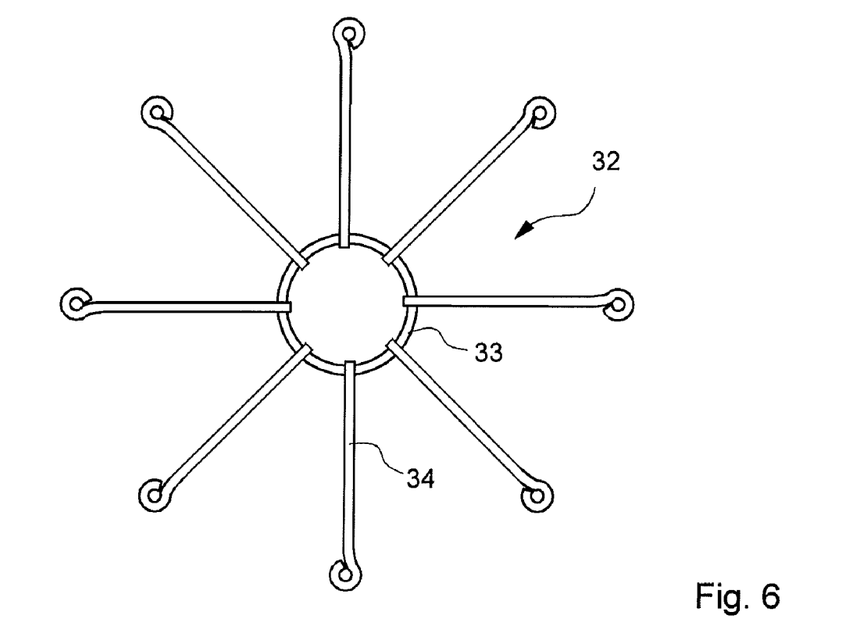
FIG. 6 is a cross-sectional view of the basic support element before forming to a required size (diameter of cage), with standardized ring and 8 standardized rays with eyes.

In a preferred embodiment, the propeller-shaped filter bag 10 is placed over a frusto-conical propeller-shaped support cage 30. This support cage is preferred to be formed by supports 32 and pairs of laterally offset frusto-conical longitudinal wires 31 that form the frusto-conical cage. FIG. 8. The longitudinally, evenly spaced supports 32, as shown in the embodiment of FIG. 6, are comprised of a ring 33 with radially-outwardly-in-equal-distance-arranged rays with eyes 34, which are bent to the proper diameter needed (FIG. 7), and may be connected by blind rivets 35 to the washers 36 holding together each pair of wires 31 and so forming a ray 14 of the frusto-conical propeller pattern. The filter bag as shown ends in a moulded propeller-shaped bottom 15 (FIG. 10), and may be installed by means of a ring 16, snap-band 17 or other fixture integrated in a top portion of the assembly, as shown in FIGS. 11-14.

Figures 2, 3, 5:
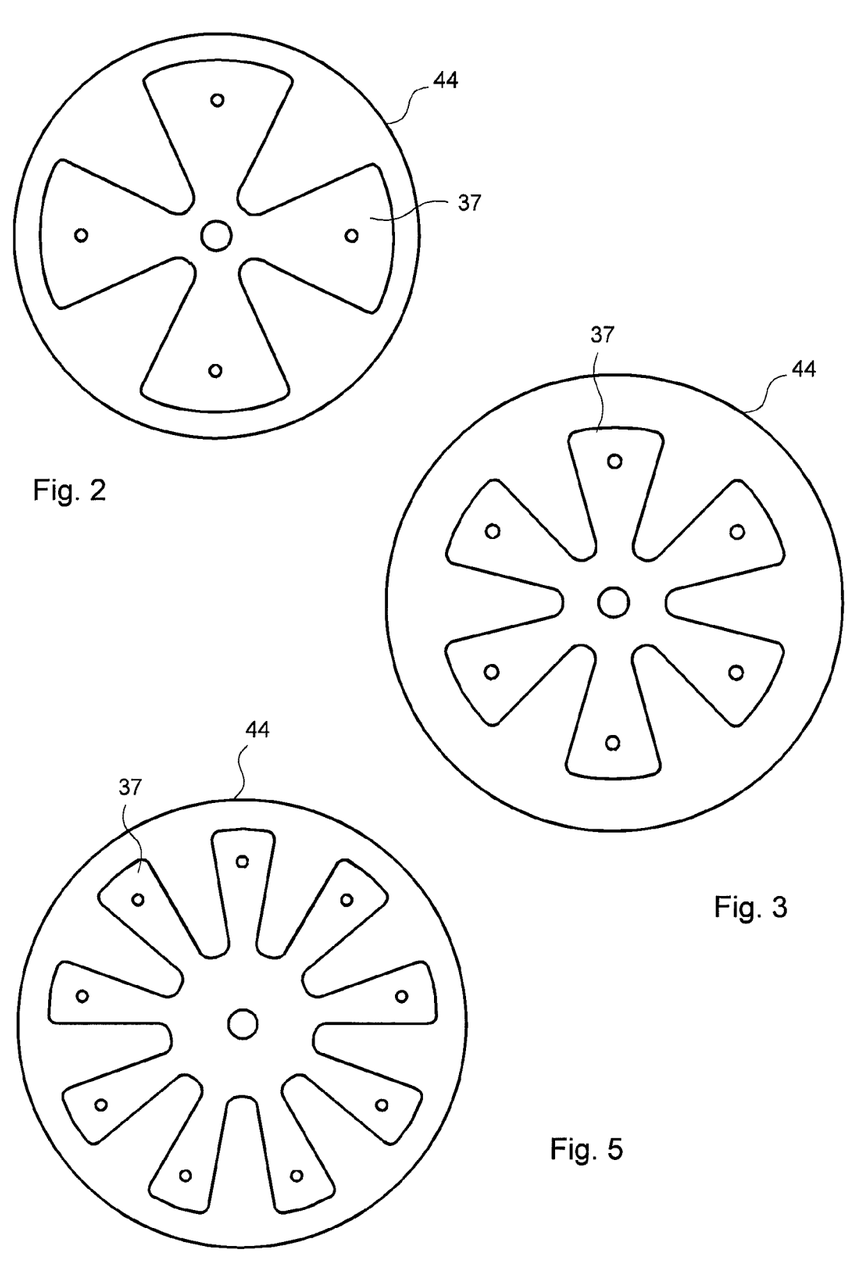
FIGS. 2, 3, 4, and 5 are cross-sectional views of different embodiments of frusto-conical propeller-shaped bottoms projected into the top open circle of the corresponding filter bags (cell plate and gasketing size), demonstrating the frusto-conical form of each of these frusto-conical, propeller-shaped filter bags.

FIG. 2 shows a propeller-shaped metal end piece 37 of a 4-ray cage embodiment of the invention. This will support, for example, a 110/95 mm Ø frusto-conical propeller shaped bag 10 rendering, for example, about 54% more filtration area than a 110 mm Ø pulse-jet filter bag of the same length as previously known.

FIG. 3 shows an embodiment of the invention having a propeller-shaped metal end piece 37 of a 6-ray cage. A 140/115 mm Ø frusto-conical propeller-shaped bag 10 of this embodiment offers about 64% more filtration area in comparison to a 140 mm Ø pulse-jet filter bag 44 of equal length as previously known.

Figure 4:
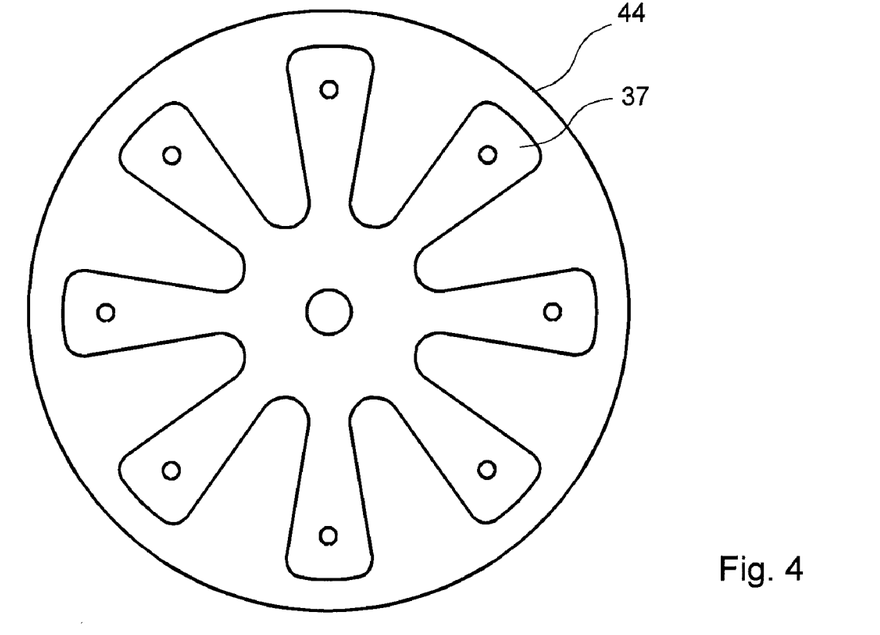

FIG. 4 shows an embodiment of the invention having a propeller-shaped metal end piece 37 of a 8-ray cage. A 150/130 mm Ø frusto-conical propeller-shaped bag 10 of this embodiment renders 100% more filtration surface than a 150 mm Ø pulse-jet filter bag 44 of the same length as previously known.

Figure 4A:
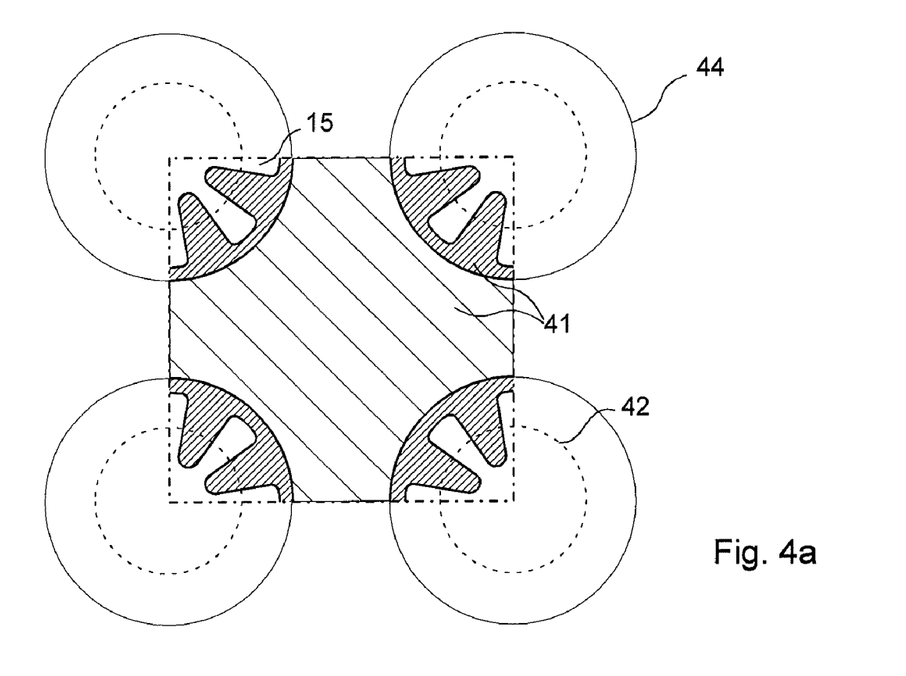
FIG. 4a demonstrates additional open space gained between the bottoms of frusto-conical filter elements in comparison to using cylindrical filter elements.

FIG. 4a shows a foot print demonstrating the additional open space 41 gained when replacing 150 mm Ø pulse-jet filter bags previously known with 150/130 mm Ø frusto-conical propeller-shaped filter bags 10 having moulded propeller-shaped bottoms 15. FIG. 4. In this embodiment, the gain of additional open space between the bags is 35%, reducing the can velocity by the same percentage, with a constant gas volume. By cutting the air to cloth ratio in half, the differential pressure will be reduced by about 40% or more. A mean diameter 42 of 100 mm Ø in connection with the propeller form 40 significantly reduces the particle migration from row to row of filters during the cleaning cycle. As a result, cleaning pressure can be lowered, for example, to as low as 2.2 bar, which will lead to higher filtration efficiency, and reduce particle-migration after the pulse-jet cleaning cycle. Energy savings of as much as 50% or more yields substantial economic gains, less wear-and-tear on the filter bag and, therefore, extended life-span of the filter bag.

FIG. 5 shows a propeller-shaped metal end piece 37 of a 9-ray cage for a 170/145 mm Ø frusto-conical propeller-shaped filter bag 10 rendering 100% more filtration area in comparison to a 170 mm Ø pulse-jet filter bag 44 of equal length.

FIG. 6 shows a support element 32 comprised of a ring 33 with 8 radially outwardly and equally-spaced-apart rays with eyelets 34. For all known bag diameters 44 of this embodiment, the same ring 33 and the same rays with eyelets 34 can be used, which will be bent to the required diameter as shown in FIG. 7.

Figure 7:
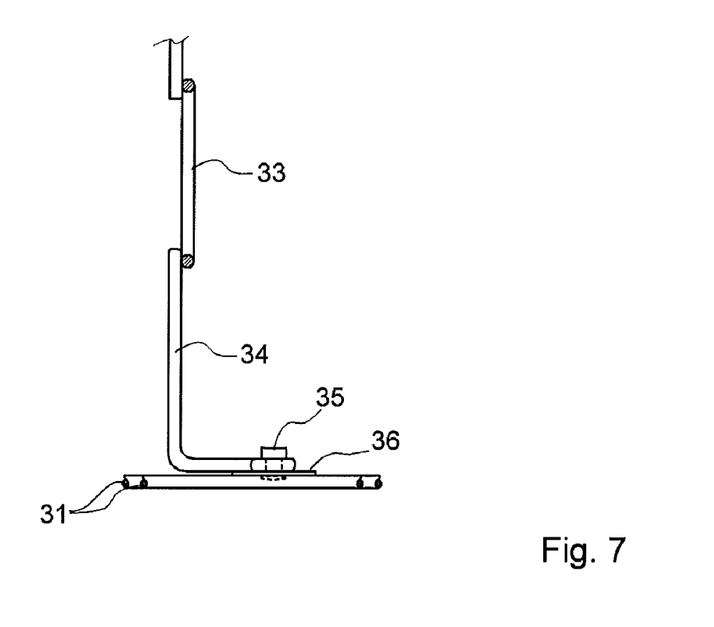
FIG. 7 is a cross-sectional view of the ring and one ray with eye of FIG. 6 bent 90° to the diameter size of the frusto-conical propeller-shaped support cage.
Figure 8:
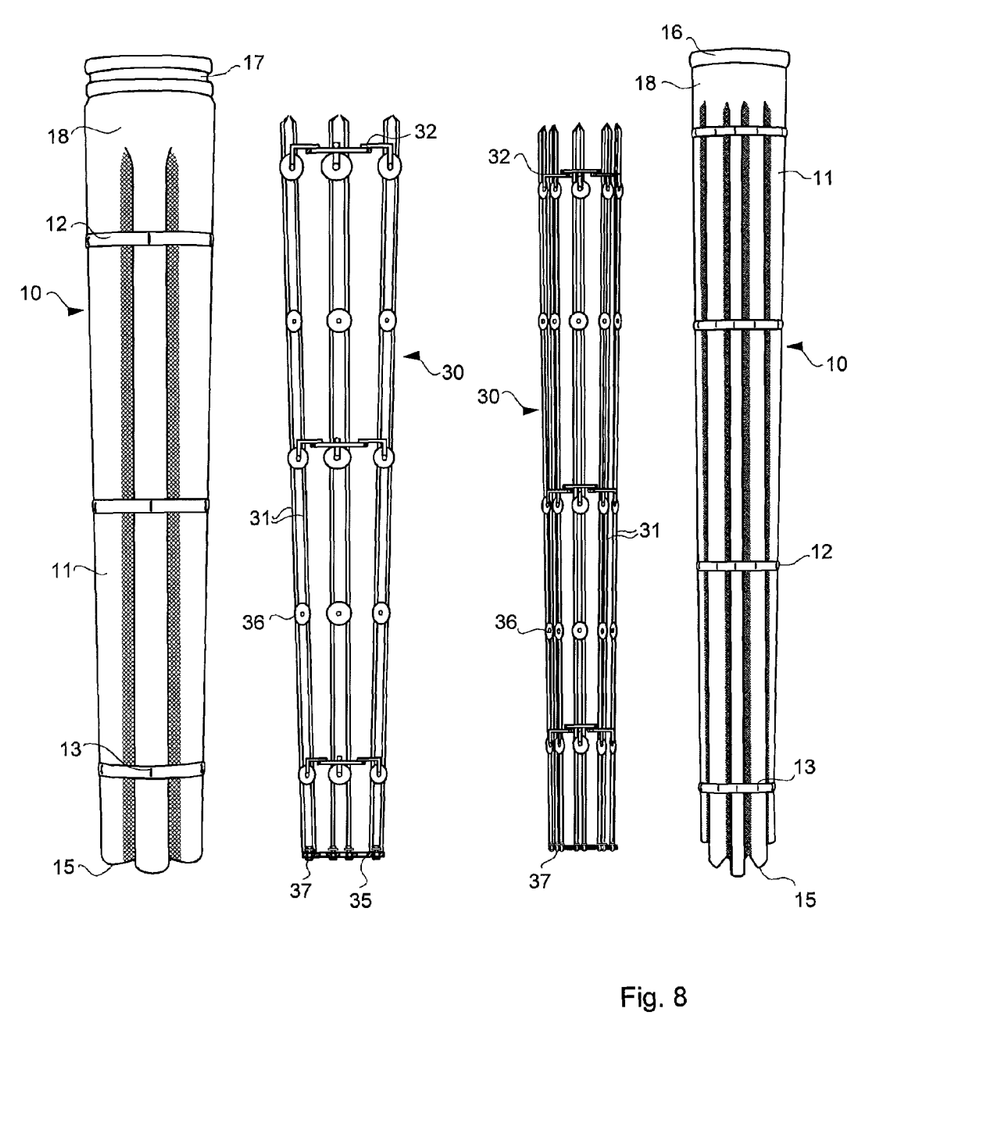
FIG. 8 is a plan view of two typical, but dimensionally different, frusto-conical propeller-shaped filter elements having appropriately shaped bags with accompanying inner propeller-shaped support cages.

FIG. 7 discloses an embodiment comprising pairs of laterally offset and frusto-conical longitudinal wires 31 that are connected by means of blind rivets 35. The wire pairs are separately made to length by spot welding special washers 36 in-equal-distance to both wires.

FIG. 8 shows an embodiment of two typical frusto-conical propeller-shaped filter bags 10 without box-pleats 18 at the top, and with moulded propeller-shaped bottoms 15. One filter bag is a 4-ray version with snap band cuff 17 and one filter bag is an 8-ray version with ring cuff 16. The corresponding frusto-conical propeller-shaped support cage 30 is shown beside its filter bag.

Figure 9:
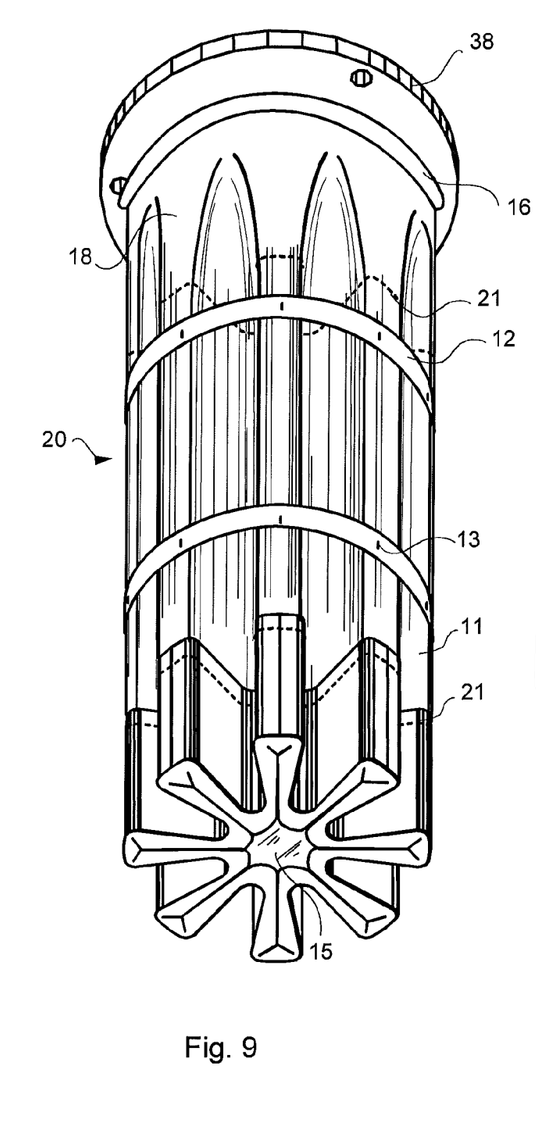
FIG. 9 is a plan view of a frusto-conical propeller-shaped filter element having an appropriately shaped bag with an integrated flange to replace a typical pleated cartridge filter element or filter bag.

FIG. 9 shows an embodiment of a frusto-conical propeller-shaped cartridge filter element 20 having a bag without box-pleats 18 at the top, with top ring cuff 16 and with a moulded propeller-shaped bottom 15 mounted on an exchangeable frusto-conical, propeller-shaped support cage 30 with a top flange 38. The much higher air to cloth ratio of this cartridge filter bag will more than compensate for the smaller filtration area in comparison to a star-like pleated cartridge filter. The moulded propeller-shaped bottom 15 and the drop-off sides 43 reduce the can velocity, improve the cleaning efficiency, and will not allow the filter bag to clog up as is so often experienced with conventional pleated cartridges with agglomerating dust, e.g. wet paper dust, and dust from plasma welding or laser cutting.

Figure 10:
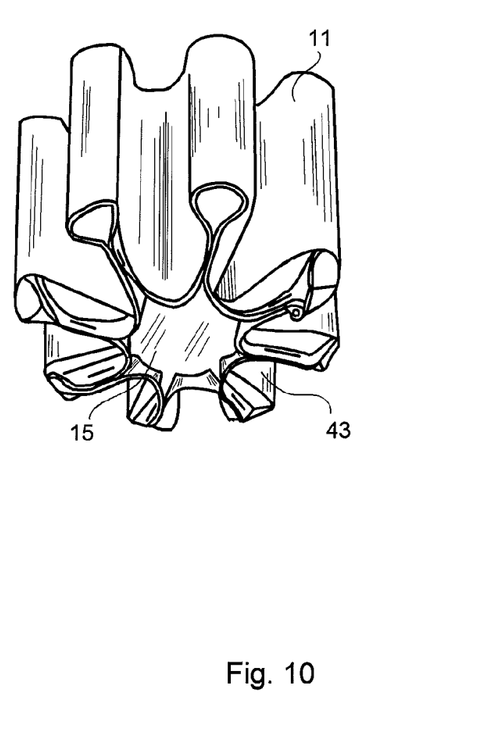
FIG. 10 is a perspective view of a propeller-shaped moulded bottom or boot.

FIG. 10 shows an embodiment of a typical 8-ray moulded propeller shaped bottom or boot 15 with open drop-off sides 43. This boot can be economically produced and attached to the main filter body, such as by sewing a horizontal seam 21. FIG. 9.

Figure 11:
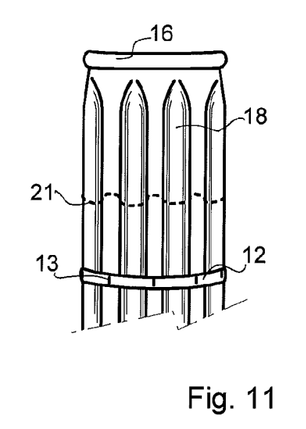
FIG. 11 is a side view of the top of an 8-ray frusto-conical propeller-shaped filter bag without pleats and with ring cuff.

FIG. 11 shows a preferred version of a top without pleats 18, and having a ring cuff 16.

Figure 12:
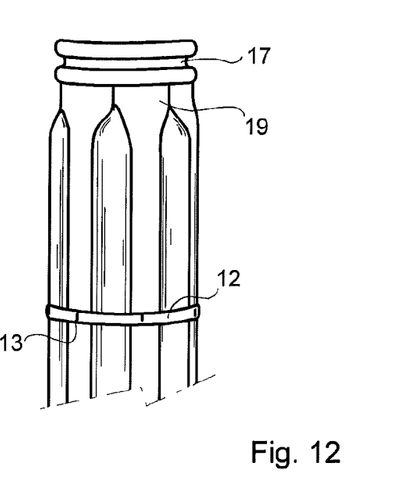
FIG. 12 is a side view of the top of a 6-ray frusto-conical propeller-shaped filter bag with box pleats and snap-band cuff.

FIG. 12 shows another version of a top with box pleats 19 and snap-band cuff 17.

Figure 13:
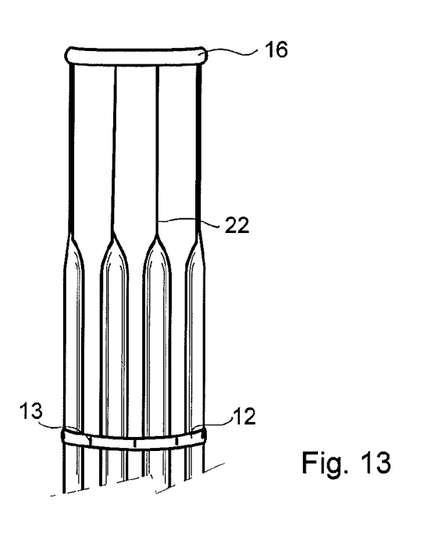
FIG. 13 is a side view of the cylindrical top part of a 8-ray frusto-conical propeller-shaped filter bag with a ring cuff, which is preferred when using interior venturis.

FIG. 13 shows an embodiment showing cylindrical top with ring cuff 16 and inner overlap seams 22 as recommended for interior venturis.

Figure 14:
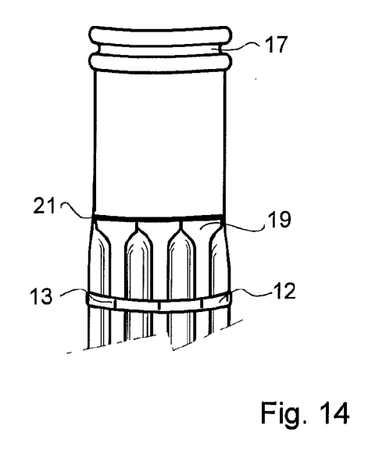
FIG. 14 is a side view of the top part of a 8-ray frusto-conical propeller-shaped filter bag, whereby a cylindrical cuff with a snap-band is sewed onto a propeller-shaped filter bag with box pleats, which is preferred when using interior venturis.

FIG. 14 shows a cylindrical top with snap-band cuff 17 sewed with a horizontal seam 21 onto a propeller-shaped filter corpus with box pleats 19, which is preferred for interior venturis.

In the preferred embodiment shown in FIGS. 9 and 11, the filter cartridge and filter bag are without pleats at the top and have a moulded bottom. Both filter bags are open at the top and closed on the bottom. The bottom piece of the frusto-conical propeller-shaped fabric filter is moulded in the exactly required radially extending propeller form and may be secured by fasteners such as metal clamps or staples.

Polyurethane, silicone or other mouldable material may be used to form the moulded bottom of the filter bags. The very top of a preferred filter bag is not propeller-shaped, but is cylindrical. Snap-band rings with double-beaded gasketing, felt strips, rings or other conventional installation methods may be employed for mounting the filter bags. The open top can therefore be made to fit any standard cell plate and gasketing size.

The filter media may be chosen from many materials used for industrial dust filtration, and may be needled felt, non-woven, woven material, warp-knitted, circular knitted fabric also out of micro-filament yarn and fibers, fiberglass and/or metal-fabrics, and others. The length and diameter of the filter bag is variable in accordance with the needs in line of the filter housing dimensions. A preferred filter bag of the invention comprises filter media which can withstand temperatures up to 280° C.

Interior venturis or special types of filter material (e.g. glass, woven, light-weight-spun-bond material) may make it desirable to deviate from the preferred pleat-free open top form and to use a box-pleat design sewed onto a tubular top FIG. 14 or an inner overlap-seam design, forming a tubular top. FIG. 13.

Bands on the exterior of the filter bag may be used to give the filter bag the multi-propeller-blade shape, and also prevent the filter bag from expanding too much during the pulse-jet cleaning cycle. The bands are placed horizontally around the filter bag at calculated intervals along the length of the bag. The smaller outer-circumference of the filter bag is created by matching marks on the band to proportionally-greater-distanced marked points on the bags. These marks are then joined together by sewing, stapling, or other techniques.

The filter bag must have an inside support, which may be a cage. To meet the needs of the individual application, this cage is preferred to be constructed of rigid materials such as steel or stainless steel, whereby all steel parts can be treated or coated as required. The cage may have, for each propeller-blade, a pair of wires forming a frusto-conical shape along the length of the cage from the riveting points of the supports, which are placed at regular intervals down the length of the cage. The filter material is preferred to touch the cage only along the edges of the wires, which minimizes mechanical abrasion and also allows full use of the filter material as a filtration surface.

The filter cages may be constructed as a single piece or they may be delivered in an assembly set, to be mounted together on the location site with fasteners such as rivets. Long cages may be constructed in two pieces, with tubular inner joints, to be assembled during installation.

The invention as disclosed in this embodiment may be used to replace cartridge filters, with the definitive advantage of having drop-off sides that have no obstacles to catch and retain dust and polluted particles. The cage with the preferred top flange is reusable when the frusto-conical, propeller-shaped fabric filter bag is replaced.

The filter bag according to the invention achieves a filtration surface which is 1.5 to 2 times as large as a conventional pulse-jet filter bag of the same top diameter and length. Moreover, when the resulting filter bag is stabilized by a frusto-conical, propeller-shaped support cage 30 and circular bands 12, the filter material 11 of the bag is moved more gently at lower pressure during the pulse-jet cleaning cycle. The frusto-propeller shaped design has less inner-bag air volume (as in comparison to conventional cylindrical filter bags) which reduces the compressed air and energy consumption needed during the pulse-jet cleaning cycle, permitting that the frusto-propeller-shaped filter bags and cartridges can be cleaned less aggressively in comparison to conventional pulse-jet filter bags.

The advantages gained in using the preferred filter are:
lower differential pressures
lower can velocity
less particulate migration after pulse cycle
meeting highest emission standards due to better fine dust retention
enhanced dust-release due to propeller form, flex motion and slick drop-off sides 43
mountable frusto-conical propeller-shaped support cage 30 substantially facilitates and reduces the cost of transportation
This frusto-conical propeller shaped filter bag 10 with a moulded propeller-shaped bottom or boot 15 according to the invention, will substantially lower energy cost substantially, increase the capacity and usable life span of filter bags, thereby reducing operating cost.

Thus the many aforementioned objects and advantages are most effectively attained. Although preferred embodiments of the invention have been disclosed, and described in detail herein, it should be understood that this invention is in no sense limited thereby and its scope is to be determined by that of the appended claims.

LIST OF ELEMENTS NUMBERED IN THE DRAWINGS

10 Frusto-conical propeller-shaped filter bag
11 Filter cloth or filter fabric
12 Circular band
13 Band attachment (seam, staple and others)
14 Ray or propeller blade
15 Moulded propeller-shaped bottom or boot
16 Ring cuff
17 Snap-band cuff
18 Top without pleats
19 Box-pleats
20 Frusto-conical propeller-shaped cartridge filter element
21 Horizontal seam
22 Inner over lap seam
30 Frusto-conical propeller-shaped support cage
31 Frusto-conical longitudinal wire pair
32 Support element
33 Ring
34 Ray with eye
35 Blind rivet
36 Washer
37 Propeller-shaped metal end piece with holes for blind rivets
38 Top flange
40 Propeller form
41 Open space
42 Mean diameter
43 Drop-off side
44 Top bag diameter, cell plate fit

What is claimed is:

1. A pulse jet filter element, comprising:
an inner cage; and
a filter bag surrounding the inner cage, the filter bag comprising a center portion and a plurality of spaced apart rays that extend radially from the center portion, wherein each of the rays comprises a terminal end that is distal to the center portion of the filter bag, and wherein the terminal end of the rays is enlarged from and wider than a portion of each of the rays that is adjacent to the center portion of the filter bag, and wherein the filter bag forms a propeller shape in a cross-sectional view, and wherein each of the plurality of rays extends from near a top of the filter bag to a bottom end of the filter bag, and wherein the center portion forms a wall between each of the rays that separates each ray from the adjoining rays, and wherein an interior of each of the rays communicates with the interior of the center portion of the filter bag, the bag having an open upper end and a closed lower end.

2. A pulse jet filter element as described in claim 1, wherein each of the rays tapers from the terminal end to a smaller portion that is adjacent to the center portion of the filter bag.

3. A pulse jet filter element as described in claim 1, wherein the filter bag comprises six (6) spaced apart rays.

4. A pulse jet filter element as described in claim 1, wherein the filter bag is formed in a frusto-conical shape that tapers from near a top of the filter bag to the bottom end of the filter bag.

5. A pulse jet filter element as described in claim 1, wherein the inner cage is tapered from near a top end of the inner cage to a bottom end of the inner cage, and the filter bag is formed in a frusto-conical shape that tapers from a larger top of the filter bag to a smaller bottom end of the filter bag, and wherein the filter bag is mounted over the inner cage, and the filter bag is held longitudinally in the frusto-conical shape by the inner cage.

6. A pulse jet filter element as described in claim 1, said filter bag further comprising a closed and molded, propeller shaped boot that is affixed to the bottom end of the filter bag.

7. A pulse jet filter element as described in claim 1, said filter bag further comprising a closed and molded, propeller shaped boot that is affixed to the bottom end of the filter bag, the molded, propeller shaped boot comprising a center portion and a plurality of spaced apart rays that extend radially from the center portion, wherein each of the rays of the molded, propeller shaped boot comprises a terminal end that is distal to the center portion of the molded, propeller shaped boot, and wherein the terminal end of the rays of the molded, propeller shaped boot is enlarged from a portion of each of the rays of the molded, propeller shaped boot that is adjacent to the center portion of the molded, propeller shaped boot, and wherein the center portion of the molded, propeller shaped boot forms a wall between each of the rays of the molded, propeller shaped boot that separates each ray of the molded, propeller shaped boot from the adjoining rays, and wherein each of the rays of the filter bag is present in one of the rays of the molded, propeller shaped boot.

8. A pulse jet filter element as described in claim 1, wherein the inner cage comprises radial members that extend from a center of the cage, and wherein the inner cage comprises enlarged ends that are present within the enlarged terminal ends of the rays of the filter bag.

9. A pulse jet filter element as described in claim 1, said filter bag further comprising a pleat-free top portion of the filter bag that is above the plurality of spaced apart rays, and wherein the plurality of spaced apart rays are positioned below the pleat-free top portion of the filter bag and the rays are formed by a pleat free construction.

10. A pulse jet filter element as described in claim 1, said filter bag further comprising box pleats near the top portion of the filter bag that is above the plurality of spaced apart rays.

11. A pulse jet filter element as described in claim 1, wherein the filter bag comprises filter media chosen from a group consisting of glass fabric and spun-bond material.

12. A pulse jet filter element as described in claim 1, wherein said filter bag comprises a gasketing device at an open first end of the filter bag, and wherein the filter bag is mounted and fixed in a cell plate.

13. A pulse jet filter element as described in claim 1, wherein the inner cage comprises a plurality of longitudinally spaced supports, each of the plurality of longitudinally spaced supports comprises eyelets at an end thereof that is distal to a center of the inner cage, the eyelets constructed and arranged for receiving and holding a plurality of offset, longitudinally-extending wires forming a frusto-conical shape, wherein the offset, longitudinally-extending wires form a support that engages and holds the spaced apart rays of the filter bag.

14. A pulse jet filter element as described in claim 5, wherein the inner cage comprises a plurality of longitudinally spaced supports, and each of the plurality of longitudinally spaced supports comprises eyelets at an end thereof that is distal to a center of the inner cage, the eyelets constructed and arranged for receiving and holding a plurality of offset, longitudinally-extending wires forming a frusto-conical shape, wherein the offset, longitudinally-extending wires form a support that engages and holds the spaced apart rays of the filter bag.

15. A pulse jet filter element as described in claim 1 further comprising fasteners that connect the filter bag to the inner cage, wherein the pulse jet filter element according to claim 1 is constructed and arranged for assembly of the pulse jet filter element at a site of a pulse jet filter.

* * * * *